United States Patent [19]

Lichter et al.

[11] 4,240,998
[45] Dec. 23, 1980

[54] PROCESS FOR THE PRODUCTION OF COMPOSITE FOAMED MATERIAL

[76] Inventors: Seymour Lichter, 137 Fairway Dr.; Frank P. Nold, Rte. 2, Box 60, both of New Castle, Ind. 47362

[21] Appl. No.: 27,523

[22] Filed: Apr. 5, 1979

Related U.S. Application Data

[63] Continuation-in-part of Ser. No. 878,720, Jan. 17, 1978, abandoned.

[51] Int. Cl.³ .............................................. B29D 27/00
[52] U.S. Cl. .................................. 264/45.4; 264/122; 264/DIG. 7; 428/402; 521/54; 521/59; 521/70; 521/137
[58] Field of Search .................. 264/45.4, DIG. 7, 54, 264/122; 521/54, 59, 70, 137; 428/95, 402

[56] References Cited

U.S. PATENT DOCUMENTS

| 2,878,153 | 3/1959 | Hacklander | 264/DIG. 7 |
|---|---|---|---|
| 2,892,216 | 6/1959 | Steel | 264/DIG.7 |
| 2,958,905 | 11/1960 | Newberg et al. | 264/DIG. 7 |
| 2,959,508 | 11/1960 | Graham et al. | 264/54 X |
| 3,114,722 | 12/1963 | Einhorn et al. | 264/DIG. 7 |
| 3,251,916 | 5/1966 | Newnham et al. | 264/DIG. 7 |
| 3,300,421 | 1/1967 | Merriman et al. | 521/70 X |
| 3,503,840 | 3/1970 | Parrish | 428/95 X |
| 3,585,157 | 6/1971 | Beck | 521/137 X |
| 3,607,797 | 9/1971 | Rubens | 521/59 |
| 3,878,133 | 4/1975 | Rubens | |
| 3,894,973 | 7/1975 | Yunan | 521/54 |

FOREIGN PATENT DOCUMENTS

| 889278 | 2/1962 | United Kingdom | 264/DIG. 7 |
|---|---|---|---|
| 1033702 | 6/1966 | United Kingdom | 264/DIG. 7 |

*Primary Examiner*—Philip Anderson
*Attorney, Agent, or Firm*—Woodard, Weikart, Emhardt & Naughton

[57] ABSTRACT

A process is disclosed herein for the production of a composite foamed material which comprises premixing expandable polystyrene beads and a binder and adding the premix to fragments of resilient, open-celled material. The materials are combined in the proportions of about 4–15% polystyrene beads, about 6–25% binder and about 60–90% open-celled material. The combined materials are compressed to a density of about 5–30 lbs per cubic foot, preferably 5–17 lbs per cubic foot, and steam is applied to the compressed materials to cure the binder and expand the polystyrene beads, producing the desired composite foamed material.

13 Claims, 1 Drawing Figure

U.S. Patent      Dec. 23, 1980      4,240,998
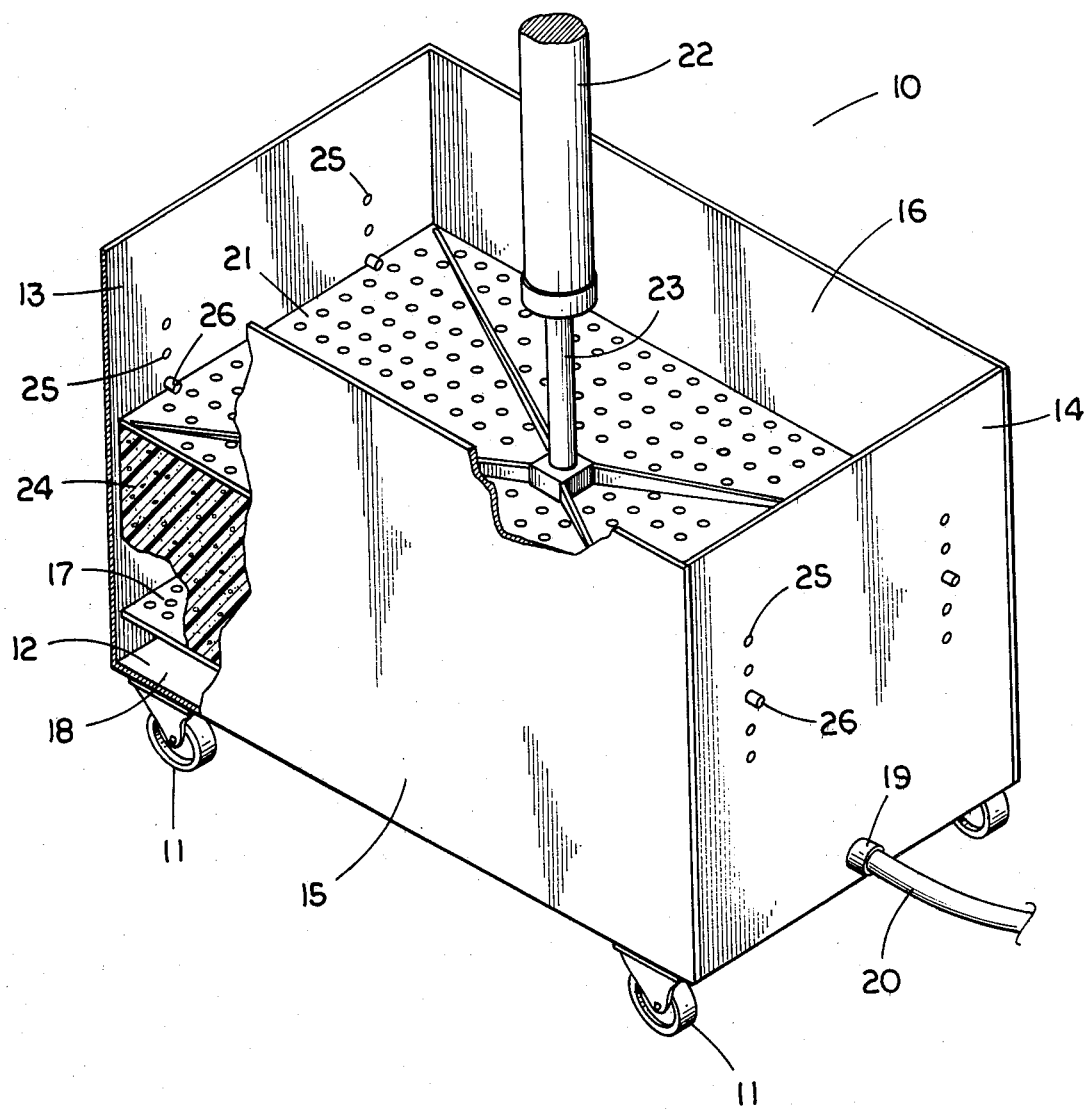

PROCESS FOR THE PRODUCTION OF COMPOSITE FOAMED MATERIAL

CROSS-REFERENCE TO RELATED APPLICATION

This is a continuation-in-part of our earlier, co-pending application, Ser. No. 878,720, filed Jan. 17, 1978 and now abandoned.

BACKGROUND OF THE INVENTION

1. Field of the Invention

The present invention relates to a process for the production of resilient cellular materials and more particularly to a process for producing a composite foamed material.

2. Description of the Prior Art

A variety of cellular, and particularly foamed, materials are well known in the prior art. Procedures for the production of such materials have correspondingly been known in the art, as well as procedures for producing composite materials which include foamed or cellular materials. It is recognized that the advantage of a composite material is that it typically displays physical properties which differ from the individual components of the material. Further, the composite may be less expensive than an isolated material due to the inclusion of relatively inexpensive fillers. The present invention provides a composite foamed material, and a process for the production thereof, having particularly advantageous physical characteristics for certain applications.

In U.S. Pat. No. 3,300,421, issued to Merriman et al. on Jan. 24, 1967, there is disclosed a process for the production of "bonded resilient fragment" materials. The Merriam et al. patent discloses a process in which substantially rigid, pre-expanded glass or synthetic resin particles are combined with resilient cellular material and a bonding agent. The resultant mix is compressed while substantial bonding occurs. The material produced by the process of the Merriman et al. patent is particularly adapted for certain applications.

The Merriman et al. procedure employs already expanded polystyrene granules, which granules are therefore uniform in shape. In contrast, the present invention includes the expansion of polystyrene beads while under compression and while in combination with resilient cellular material, and thereby produces irregularly-shaped, expanded beads. It has been found that as a result of this expansion of the polystyrene beads while commingled with the cellular material, in distinction from the Merriman et al. process, a more intimate relationship between the two components is achieved. For example, it has been observed that closely spaced polystyrene beads, when expanded in proximity with the existent cellular material, will trap portions of the cellular material therebetween, which would not result by the process of the Merriman et al. patent. In addition, the compression of the material in accordance with the Merriman et al. patent tends to crush the pre-expanded polystyrene beads, whereas the expansion of the beads after the step of compression and in the presence of the existant cellular material will tend not to produce "crushed" beads, but only to cause the beads to expand in irregular fashion. For these reasons, it will be appreciated that the process of the present invention differ from that of the Merriman et al. patent, and as a direct consequence yields a different and distinctive composite foamed material. A related cushioning material comprising a mixture of shredded pneumacel batting and shredded particles of polyurethane or rubber bonded together by an elastomeric binder is disclosed in U.S. Pat. No. 3,894,973, issued to Yunan on July 15, 1975.

A number of other composite foamed materials have been proposed in the prior art. In U.S. Pat. No. 3,607,797, issued to Rubens et al. on Sept. 21, 1979, there is disclosed a composite foam having copolymer particles dispersed throughout a urethane foam matrix. The composite foam of the Rubens et al. patent is prepared by combining expandable copolymer beads with a polyurethane foam precursor, and thereafter allowing the mixture to foam. Similar materials having thermoplastic beads which are expanded with the surrounding and primarily supporting foam material are disclosed in U.S. Pat. Nos. 3,878,133, issued to Rubens on Apr. 15, 1975, and 2,958,905, issued to Newberg et al. on Nov. 8, 1960. In U.S. Pat. No. 3,503,840, issued to Parrish on Mar. 31, 1970, there is disclosed a composite material having closed-cell reinforcing particles supported within a surrounding foam matrix, the closed-cell particles not being expanded with the foam matrix.

Einhorn et al. disclosed in U.S. Pat. No. 3,114,722, issued on Dec. 17, 1963, a composite material comprising shredded cellular material bonded together by a prepolymer binder. Procedures for the production of foamed materials in which polystyrene beads are held together with a binder are disclosed in U.S. Pat. Nos. 3,585,157, issued to Beck on June 15, 1971, and 2,959,508, issued to Graham et al. on Nov. 8, 1960.

SUMMARY OF THE INVENTION

In one aspect of the present invention there is provided a method for the production of a composite foamed material, which method comprises combining expandable polystyrene beads, a binder, and resilient open-celled material, followed by compressing the combined materials to a density of about 5–30 lbs/ft$^3$, preferably 5–17 lbs/ft$^3$, and curing the binder and expanding the polystyrene beads while the material is held in compression. Another aspect of the present invention provides a composite foamed material comprising the previously mentioned materials in combination, the polystyrene beads being expanded in situ.

It is an object of the present invention to provide a process for the production of a composite foamed material, which process is readily performed and yields a uniform product.

Another object of the present invention is to provide a process for the production of a composite foamed material having novel and advantageous physical characteristics for particular applications.

It is a further object of the present invention to provide a process for the production of a composite foamed material, which process permits the utilization of relatively simple and readily available blending and proportioning equipment.

Another object of the present invention is to provide a novel process for producing a composite foamed material having advantageous and uniform physical properties.

Further objects and advantages of the present invention will become apparent from the description of the preferred embodiment which follows.

BRIEF DESCRIPTION OF THE DRAWING

The FIGURE is a perspective view of a container useful as a mold in conjunction with the present invention.

DESCRIPTION OF THE PREFERRED EMBODIMENT

A number of isolated and/or composite foamed materials are known in the prior art, together with the various processes for the production thereof. The present invention provides a simple and readily performed process for the production of a novel, composite foamed material having particularly advantageous physical properties for certain applications. The composite foamed material of the present invention is easily produced by the described process, and is particularly useful as a cushioning or padding material, particularly for impact absorption.

In accordance with the process of the present invention, expandable polystyrene beads, a binder, and resilient open-celled material are combined together in a mix which is subsequently compressed during expansion of the beads and curing of the binder. The constituents may be combined in typical fashion with available mixing devices. It has been found, however, that the polystyrene beads and the binder are preferably premixed and subsequently added to the fragments of resilient, open-celled material.

The purpose for premixing these ingredients is that it is desirable to obtain a thorough and even distribution of the polystyrene beads with the open-celled material. It will be appreciated to one skilled in the art that a dispersion of the polystyrene beads in the open-celled material alone is not obtainable since the small, dense polystyrene beads tend simply to fall to the bottom of the mixing container, thus effectively separating from the open-celled material. Addition of the binder at that point would effectively retain the separation to at least some degree. Similarly, if the binder and open-celled material are mixed initially the polystyrene beads, upon addition, will tend to become concentrated on the contacted portions of the binder/open-celled material mix, and a non-uniform material may result. It has been discovered that by premixing the binder with the polystyrene beads, a subsequent mixing with the fragmented, open-celled material will produce a uniform product since the polystyrene beads have been evenly distributed within the binder. The binder and associated beads become evenly distributed throughout the fragmented, open-celled material.

Essentially any of the commercially-available, expandable polystyrene beads may be utilized in the process of the present invention. Polystyrene beads are generally available as unexpanded, or as partially or fully expanded. The present invention does not encompass the utilization of fully pre-expanded polystyrene beads, but would include the use of partially pre-expanded polystyrene beads to the extent that such beads would be further expandable. It is preferred, however, that the polystyrene beads not be pre-expanded.

Expandable polystyrene beads are well known in the art. Such beads typically comprise the polystyrene itself together with a blowing agent comprising a volatile liquid such as a mixture of pentanes. The pre-expanded polystyrene beads utilized in the present invention preferably have a maximum diameter of about 0.1 mm. A particular type of polystyrene bead found to be useful in the present invention is that marketed under the trademark Fostofoam by the Foster Grant Co., Inc., Leominster, Mass. The Fostofoam polystyrene beads are typical and comprise 92–93% styrene and 6–7% blowing agent. Other expandable polystyrene bead compositions are well known, and would be equally suitable for use in the present invention.

The expandable polystyrene beads are preferably premixed with a suitable binder for subsequent addition to the fragmented, open-celled material. A substantial variety of suitable binders, also known in the art as bonding agents, are well known and equally useful in the present invention. Appropriate binders would include, for example, liquid polyurethane-forming compositions, effecting the bonding by a single-stage reaction or by an intermediate prepolymer reaction product. Other examples are the compositions based on liquid organic polysulfides together with epoxy resins. The suitability of various known binders would be readily apparent to one skilled in the art, or would be easily determined by experimentation. It will be appreciated that the binder, upon curing or setting, should securely bond together the fragmented open-celled material and the expanded polystyrene beads, while permitting the resulting material to be flexible.

A particular binder found to be useful in accordance with the present invention is that marketed under the trademark Mistabond 324-S by M-R Plastics & Coatings, Inc., Maryland Heights, Missouri. The Mistabond 324-S is a urethane prepolymer binder which is a clear, amber liquid comprising less than 10% methylene chloride and less than 15% toluene diisocyanate. Mistabond 324-S has a low viscosity and a high flashpoint, and displays excellent wetting characteristics. As will be further described, the preferred process of the present invention utilizes the application of steam for curing or accelerating the binder and for expanding the polystyrene beads, and it is therefore preferable that the binder employed be steam-curable, although other binders such as water-accelerated binders will work equally well with appropriate modifications to the preferred process.

The polystyrene beads and the binder, preferably after premixing of the two, are added to fragments of resilient, open-celled material. Resilient, open-celled materials are well known in the art, and are readily available. A polyurethane, open-celled foam material is particularly desirable since it is inexpensively and readily available as shredded scrap foam. Polyurethane foam is typically obtained by reaction of a polyisocyanate, such as toluene diisocyanate or polymethylene polyphenyl isocyanate, with a polyether polyol. An exemplary process is disclosed in U.S. Pat. No. 3,878,133, issued to Rubens on Apr. 15, 1975, the relevant portions of which are hereby incorporated by reference. Other open-celled materials would be equally useful in the present invention, but are generally less available or more expensive. It is required that the polyurethane scrap or other material be open-celled since close-celled materials are too resilient to provide an advantageous composite foamed material in accordance with the present invention. Scrap polyurethane ether foam having a density of from about 1.0 lb/ft$^3$ to 5.0 lb/ft$^3$, most preferably about 3.0 lb/ft$^3$, has been found particularly advantageous in the present invention, with a polyurethane ester foam also working well but being less readily available.

The constituents are combined in preselected proportions and the resultant mix is subsequently treated to yield the composite foamed material of the present invention. The weight percentage of each of the constituents in the final mix is from about 4% to about 15% of expandable polystyrene beads, from about 6% to about 25% of the binder, and from about 60% to about 90% of the fragments of resilient, open-celled material. In a most preferred embodiment of the present invention, the constituents are combined in the proportions of about 7.5% of expandable polystyrene beads, about 12.5% of binder, and about 80% of resilient, open-celled material. It has been found to be preferable to include the binder in an amount which is about 10% of the amount of the fragments of resilient, open-celled material in order to obtain proper and adequate binding of the fragments in the resulting composite foamed material.

The materials are combined in the proportions recited above and they are briefly mixed with appropriate equipment to insure a thorough distribution of the polystyrene beads and binder in relation to the resilient, open-celled material. It will be appreciated that the resulting mixture initially is a fluffy mass. The mix is then transferred to a container, such as container 10 in the FIGURE, for further processing. In accordance with the process of the present invention, the mix of constituents is compressed within a mold to a density of from about 5 to about 30 lbs/ft$^3$, preferably 5–17 lbs/ft$^3$ and most preferably from about 7 to about 12 lbs/ft$^3$. The mix is compressed within a mold, such as container 10, and then held in compression during the expansion of the polystyrene beads and curing of the binder.

Container 10 comprises a cart having a floor 12, end walls 13 and 14, and side walls 15 and 16. As will be further described below, side walls 15 and 16 are hingedly mounted along their lower edges to floor 12, and are held in their initial, upright position by latches (not shown) securing them to the end walls. Caster wheels 11 are mounted to the underside of floor 12 to facilitate movement of the container 10 for handling purposes. A perforate plate 17 is mounted within container 10 and above floor 12. A chamber 18 is defined by the volume surrounded by floor 12, plate 17 and the side and end walls of container 10. The constituent mix is supported upon plate 17 during mixing, the perforations in the plate 17 being sufficiently small to prevent a significant amount of material from passing downwardly through the plate.

When the constituent mix has been sufficiently blended in a suitable blending apparatus to obtain uniform distribution of the materials, the container 10 is filled with a desired weight of material and thereafter positioned to receive a second perforate plate 21. Plate 21 is secured to a piston rod 23 which is received within a hydraulic cylinder 22. Cylinder 22 is mounted appropriately to a surrounding structure, such as to the ceiling of a room, so that it may operate to apply a downward, hydraulic pressure through piston rod 23 to plate 21. With container 10 positioned to receive plate 21, the plate is moved downwardly through the cooperation of hydraulic cylinder 22 and piston rod 23 to compress the mix in the container to the desired extent.

It has been found particularly convenient to utilize pins 26 received in holes 25 in the endwalls of container 10 to regulate the final volume of the composite foamed material produced in accordance with the present invention. In accordance with this technique, a known amount of the constituent mix is compressed to a certain extent, and the pins 26 are inserted in preselected ones of the holes 25. The plate 21 is then permitted to rise until it engages the pins 26, which pins then hold the plate in position during curing of the composite foamed material. By appropriate positioning of the pins 26 in the holes 25, the volume and therefore the density of the composite foamed material may be predetermined. As previously indicated, the mix is compressed to a density of from about 5 to about 30 lbs/ft$^3$, preferably 5–17 lbs/ft$^3$ and most preferably from about 7 to about 9 lbs/ft$^3$. In the latter instance, for the typical materials utilized in the present invention the initial mix is compressed to about 55% of its uncompressed volume.

With the mix held in compression, the polystyrene beads are expanded and the binder is cured. These steps may both be accomplished very readily by the application of steam to the container 10. Coupling 19 connects steam line 20 to container 10 at a location to be in communication with chamber 18. Line 20 is connected at its other end to a suitable source of steam. With the mix being held in compression between plates 17 and 21, steam is introduced through line 20 and into chamber 18. The steam passes upwardly through the constituent mix until it escapes through the perforations in plate 21. An insignificant amount of steam is lost through the holes 25 located below plate 21. By the passage of the steam through the mix, the binder is heated sufficiently to produce curing, and at the same time the polystyrene beads are heated sufficiently to cause expansion. Steam curing in this manner for a period of 2–5 minutes will generally produce sufficient polystyrene bead expansion and binder curing to permit removal of the composite foamed material, known as a bun. It has been found that typically the curing should be conducted for a limited time period, perhaps not more than 3–4 minutes, to avoid deterioration or collapse of the expanded polystyrene beads. The temperature of the curing steam must be sufficiently low to avoid collapsing the beads. It has also been discovered that in performing the described process with a container 10, the described container is preferably made from metal due to the high heat conductivity of the metal and the consequent avoidance of channeling of the steam due to localized cooling of the steam. The container should also be preheated to avoid uneven heat distribution due to the otherwise relatively cool container walls.

The binder is cured while the constituent mix is maintained under compression. As is well known in the art, the binder may be cured to a substantial extent while the material is in the mold, with further, final curing of the binder typically occurring after removal of the bun from the mold. It is of course preferable to provide for the binder curing, while the material is in the mold, to an extent sufficient to cause the material to essentially retain its molded form and size. This may be accomplished by partial or full curing of the binder while in the mold, with partial curing being preferred since it is sufficient and it reduces the period of time required for the bun to be retained in the mold. Typically there is at least a slight expansion of the bun upon extraction from the mold as is to be expected. For the purposes herein, the term curing is used to mean curing of the binder at least to the extent sufficient to cause the bun to substantially retain its molded size and shape upon removal from the mold.

Upon sufficient curing of the binder and expansion of the beads, the composite foamed material is released from container 10. This is accomplished by raising plate 21 and pivoting side walls 15 and 16 away from the material, the side walls being hingedly mounted (not shown) along their bottom edge to floor 12. The composite foamed material is thereby made accessible and may be extracted from the container 10.

The following examples of the process and product of the present invention are given to further detail and exemplify the present invention, and are not intended to limit the invention herein disclosed and claimed.

EXAMPLE 1

A composite foamed material was prepared in accordance with the method of the present invention. To 25 lbs of the urethane binder Mistabond 324-S was added 15 lbs of Fostofoam polystyrene beads. The binder and beads were thoroughly mixed and then added to 160 lbs of shredded scrap polyurethane foam, representing weight percentages of the constituents to the final material of 12.5% binder, 7.5% beads and 80% polyurethane foam scrap.

The materials were mixed well and then placed under compression in a container as shown in FIG. 1. The container was dimensioned approximately 72 in×38 in×14 in with the second perforate plate lowered to compress the mix, equivalent to a volume of about 22.2 ft$^3$ and a density for the 200 lbs of material of about 9 lbs/ft$^3$. Steam was introduced through the container for about 3 minutes to expand the beads and accelerate or cure the binder. The resultant bun was removed from the container and yielded a composite foamed material displaying excellent impact absorption characteristics. As a comparison, the resultant material had a Sag Value of 3.5-4, whereas a typical polyurethane material not having expanded polystyrene beads wound have a Sag Value of about 1.9.

EXAMPLE 2

The procedure of Example 1 was followed except that the materials were added in the proportions of 25 lbs of binder (9.6%), 30 lbs of beads (11.4%), and 207 lbs of scrap foam (79%). The resultant composite foamed material displayed excellent physical properties.

EXAMPLES 3-8

The procedure of Example 1 was followed except the amount of binder was changed in one procedure to 50 lbs and in another to 12.5 lbs. In two additional procedures the method of Example 1 was followed except the amount of beads in one instance was 30 lbs and in the other was 7.5 lbs. The procedure of Example 1 was also repeated exactly except for changing the amount of polyurethane foam in one instance to 60 lbs and in another instance to 360 lbs. Each of the resultant materials displayed good physical characteristics.

EXAMPLES 9-11

The procedure of Example 1 was followed except the materials were compressed, in four different procedures, to about 5, 7, 17 and 30 lbs/ft$^3$. Materials showing good physical properties were produced, although the materials in the density range of 7-9 lbs/ft$^3$ displayed the best physical characteristics with respect to impact absorption. These physical properties of the material are readily and accurately ascertainable by standardized test procedures, and the suitability of the material for various applications may thereby be determined.

What is claimed is:

1. A process for producing a composite foamed material which comprises the steps of:
   a. combining into a mix from about 4% to about 15% of expandable polystyrene beads, from about 6% to about 25% of a binder and from about 60% to about 90% of fragments of resilient, open-celled material;
   b. compressing the mix within a mold to a density of from about 5 to about 30 lbs/ft$^3$;
   c. curing the binder while the mix is held in compression; and
   d. expanding the polystyrene beads while the mix is held in compression.

2. The process of claim 1 in which the compressing of step b. comprises compressing the mix to a density of from about 5 to about 17 lbs/ft$^3$.

3. The process of claim 1 in which the combining of step a. comprises the substeps of premixing the polystyrene beads and the binder of disperse the polystyrene beads within the binder, and adding the premixed polystyrene beads and binder to the resilient, open-celled material.

4. The process of claim 3 in which the combining of step a. comprises the combining of about 7.5% of the polystyrene beads, about 12.5% of the binder and about 80% of the resilient, open-celled material.

5. The process of claim 3 in which the resilient, open-celled material is polyurethane foam.

6. The process of claim 5 in which the binder is a polyurethane prepolymer binder.

7. The process of claim 3 in which the compressing of step b. comprises compressing the mix to a density of from about 7 to about 9 lbs/ft$^3$.

8. The process of claim 7 in which the amount of the binder is about 10% of the amount of the resilient, open-celled material.

9. The process of claim 7 in which the polystyrene beads have a maximum diameter of about 0.1 mm prior to expansion.

10. The process of claim 7 in which the combining of step a. comprises the combining of about 7.5% of expandable polystyrene beads, about 12.5% of a binder and about 80% of resilient, open-celled material.

11. The process of claim 3 in which the curing of step c. and the expanding of step d. comprise applying steam to the mold in which the mix is held in compression.

12. The process of claim 11 in which the applying of steam is for a period of about 2-5 minutes, but for a period less than the amount of time which would cause collapse of the expanded polystyrene beads.

13. The process of claim 11 in which the compressing of step b. comprises compressing the mix between a pair of spaced apart, perforate members, and the applying of steam comprises passing steam successively through one of the perforate members, the mix, and the other of the perforate members.

* * * * *